United States Patent
Jeong et al.

(10) Patent No.: US 7,459,810 B2
(45) Date of Patent: Dec. 2, 2008

(54) STATOR OF LINEAR MOTOR

(75) Inventors: Sang Sub Jeong, Kyungki-do (KR); Sun Yong Choi, Seoul (KR); Hyuk Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 11/254,857

(22) Filed: Oct. 21, 2005

(65) Prior Publication Data

US 2006/0261681 A1    Nov. 23, 2006

(30) Foreign Application Priority Data

May 17, 2005   (KR) ...................... 10-2005-0041051
May 19, 2005   (KR) ...................... 10-2005-0042044

(51) Int. Cl.
*H02K 33/00*   (2006.01)

(52) U.S. Cl. .......................................... 310/15; 310/24

(58) Field of Classification Search ............. 310/12–39; 417/417

See application file for complete search history.

(56) References Cited

U.S. PATENT DOCUMENTS

| | | | |
|---|---|---|---|
| 4,937,481 A | 6/1990 | Vitale | |
| RE34,674 E * | 7/1994 | Beakley et al. | ........... 310/12 |
| 6,573,624 B2 * | 6/2003 | Park | ........... 310/12 |
| 6,917,127 B2 * | 7/2005 | Hong et al. | ........... 310/14 |
| 6,946,754 B2 * | 9/2005 | Inagaki et al. | ........... 310/12 |

FOREIGN PATENT DOCUMENTS

| | | |
|---|---|---|
| EP | 1 553 294 A2 | 7/2005 |
| WO | WO-03/081041 A1 | 10/2003 |
| WO | WO-2004/082103 A1 | 9/2004 |

\* cited by examiner

*Primary Examiner*—Dang D Le
(74) *Attorney, Agent, or Firm*—Birch, Stewart, Kolasch & Birch, LLP

(57) ABSTRACT

Disclosed herein is a stator of a linear motor having a plurality of outer core blocks. Each of the outer core blocks comprises first and second side core blocks and a center core block. The center core block has an inner diameter equal to an outer diameter of a coil block. Consequently, insulation and heat transfer efficiencies are improved, and the size of the linear motor is minimized. Furthermore, the center core block is provided with a heat sink part, which is inserted in the coil block for dissipating heat from the coil block. Consequently, heat generated from the coil block is effectively dissipated.

8 Claims, 11 Drawing Sheets

STATOR OF LINEAR MOTOR

BACKGROUND OF THE INVENTION

1. Field of the Invention

The present invention relates to a linear motor, and, more particularly, to a stator of a linear motor having a plurality of outer core blocks wherein each outer core block comprises first and second side core blocks and a center core block, and the center core block has an inner diameter equal to an outer diameter of a coil block, whereby insulation and heat transfer efficiencies are improved, and the size of the linear motor is minimized.

2. Description of the Related Art

Generally, a linear compressor is an apparatus that introduces, compresses, and discharges refrigerant gas (hereinafter, referred to as "fluid") through a linear reciprocating movement of a piston in a cylinder, which is performed by a linear driving force of a linear motor.

FIG. 1 is a longitudinal sectional view illustrating a linear compressor with a conventional linear motor mounted therein, FIG. 2 is a perspective view illustrating a stator of the conventional linear motor, FIG. 3 is a cross-sectional view of the stator of the conventional linear motor shown in FIG. 2, and FIG. 4 is a longitudinal sectional view of the stator of the conventional linear motor shown in FIG. 2.

Referring to FIG. 1, the linear compressor comprises: a shell 2; and a linear compression unit 4 disposed in the shell 2 for compressing fluid.

The linear compression unit 4 comprises: a cylinder block 8 having a cylinder 6; a back cover 12 having a fluid inlet port 10; a piston 14 disposed such that the piston 14 performs a linear reciprocating movement in the cylinder 6; a linear motor 20 for generating a driving force necessary for the piston 14 to perform the linear reciprocating movement in the cylinder 6; an outlet valve assembly 16 disposed in the front of the cylinder 6 for discharging the fluid compressed in the cylinder 6.

As shown in FIGS. 1 to 3, the linear motor 20 comprises a stator and a mover.

The stator comprises: a plurality of outer cores 21; an inner core 24 disposed while being spaced a predetermined gap from the outer cores 21; and a coil block 25 mounted at the outer cores 21.

The coil block 25 comprises: a bobbin 26 extending through the outer cores 21; and a coil 27 wound on the bobbin 26 for creating a magnetic field.

The mover comprises: a magnet 28 disposed between the outer cores 21 and the inner core 24 while being spaced a predetermined gap from the outer cores 21 and the inner core 24; and a magnet frame 29, to which the magnet 28 is securely fixed.

As shown in FIGS. 2 and 3, the outer cores 21 are disposed at the outer circumferential surface of the coil block 25 at predetermined intervals in the circumferential direction.

Each outer core 21 comprises: a first outer core block 22, which is formed of a plurality of stacked core sheets; and a second outer core block 23, which is formed of a plurality of stacked core sheets. The first and second outer core blocks 22 and 23 are opposite to each other while being in contact with each other.

For stability, each outer core 21 must be spaced a predetermined insulation distance from the coil block 25. Consequently, the inner circumferential surface of each outer core 21 is spaced apart from the outer circumferential surface of the coil block 25 by the above-mentioned insulation distance.

When the linear motor 20 is designed, the inner diameter $R_{21}$ of each outer core 21 is set such that the outer core 21 is spaced a predetermined gap from the magnet 28.

As shown in FIG. 3, the inner diameter $R_{21}$ of each outer core 21 does not exactly correspond to the outer diameter $R_{25}$ of the coil block 25, and therefore, the distance between an inner circumferential surface 30 of the outer core 21 and an outer circumferential surface 31 of the coil block 25 is not uniform.

Specifically, the distance $t_c$ between the inner circumferential surface 30 of each outer core 21 and the outer circumferential surface 31 of the coil block 25 at the center of the outer core 21 is greater than the distance $t_c$ between the inner circumferential surface 30 of each outer core 21 and the outer circumferential surface 31 of the coil block 25 at opposite sides of the outer core 21.

As described above, each outer core 21 must be spaced from the core block 25 by the predetermined insulation distance. Consequently, the distance $t_c$ between the inner circumferential surface 30 of each outer core 21 and the outer circumferential surface 31 of the coil block 25 at the opposite sides of the outer core 21 is set to the predetermined insulation distance.

In the stator of the conventional linear motor, however, unnecessary space is excessively formed between the inner circumferential surface 30 of each outer core 21 and the outer circumferential surface 31 of the coil block 25 at the center of the outer core 21, if the distance $t_c$ between the inner circumferential surface 30 of each outer core 21 and the outer circumferential surface 31 of the coil block 25 at the opposite sides of the outer core 21 is set to the predetermined insulation distance. As a result, the size of the linear motor 20 is increased.

Furthermore, heat generated from the core block 25 is not smoothly transmitted to each outer core 21 due to the unnecessary space formed between the inner circumferential surface 30 of each outer core 21 and the outer circumferential surface 31 of the coil block 25 at the center of the outer core 21. As a result, heat transfer efficiency is deteriorated.

Meanwhile, if an insulating member (not shown) is disposed between the outer cores 21 and the coil block 25, friction occurs between the inner circumferential surface 30 of the outer core 21 and the insulating member, since the distance between the inner circumferential surface 30 of the outer core 21 and the outer circumferential surface 31 of the coil block 25 is not uniform. As a result, the insulating member is damaged.

SUMMARY OF THE INVENTION

Therefore, the present invention has been made in view of the above problems, and it is an object of the present invention to provide a stator of a linear motor having a predetermined insulation distance between each outer core and a coil block, thereby effectively accomplishing insulation and heat transfer.

In accordance with the present invention, the above and other objects can be accomplished by the provision of a stator of a linear motor, comprising: an outer core including a plurality of outer core blocks; an inner core disposed while being spaced a predetermined gap from the outer core; and a coil block mounted at the outer core, wherein each of the outer core blocks, the inner circumferential surface of which is opposite to the outer circumferential surface of the coil block, has an inner diameter equal to an outer diameter of the coil block.

Preferably, each of the outer core blocks comprises: first and second side core blocks disposed side by side while being opposite to each other; and a center core block disposed between the first and second side core blocks, the center core block having an inner diameter equal to the outer diameter of the coil block.

Preferably, the first and second side core blocks are arranged such that inner circumferential surfaces of the first and second side core blocks are spaced a predetermined gap from an outer circumferential surface of the inner core.

Preferably, the first and second side core blocks have an inner diameter equal to an outer diameter of the inner core.

Preferably, the first and second side core blocks are securely fixed to the center core block by welding.

Preferably, the center core block is partially inserted in the coil block.

Preferably, the center core block comprises: a core part, opposite side surfaces of which are attached to the first and second side core blocks; and a heat sink part protruded from the inner circumferential surface of the core part toward the coil block.

Preferably, the center core block is formed in the shape of a "T".

Preferably, the stator further comprises: an insulating member disposed between the center core block and the coil block.

Preferably, the coil block comprises: first and second coil blocks disposed at opposite sides of the heat sink part.

According to the present invention, the stator of the linear motor is formed such that each outer core block, the inner circumferential surface of which is opposite to the outer circumferential surface of the coil block, has an inner diameter equal to the outer diameter of the coil block. As a result, a minimum insulation distance is secured between each outer core block and the coil block. Consequently, the size of the linear motor is minimized, and insulation and heat transfer efficiencies are improved.

Also, each outer core block comprises first and second side core blocks and a center core block, and the inner diameter of the first and second side core blocks is different from that of the center core block. As a result, the first and second side core blocks are spaced a predetermined gap from the inner core. Consequently, efficiency of the linear motor is maintained, and the center core block is spaced a minimum insulation distance from the coil block.

Moreover, the insulating member is disposed between the outer core and the coil block. As a result, heat transfer is accomplished from the coil to the outer core through the insulating member. Consequently, heat sink efficiency is improved.

In addition, the center core block is provided with a heat sink part, which is inserted in the coil block for dissipating heat from the coil block. Consequently, heat generated from the coil block is effectively dissipated.

Furthermore, the insulating members are disposed between the heat sink part and the first coil and between the heat sink part and the second coil, respectively. Consequently, insulation efficiency is improved, and heat sink efficiency is also improved.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
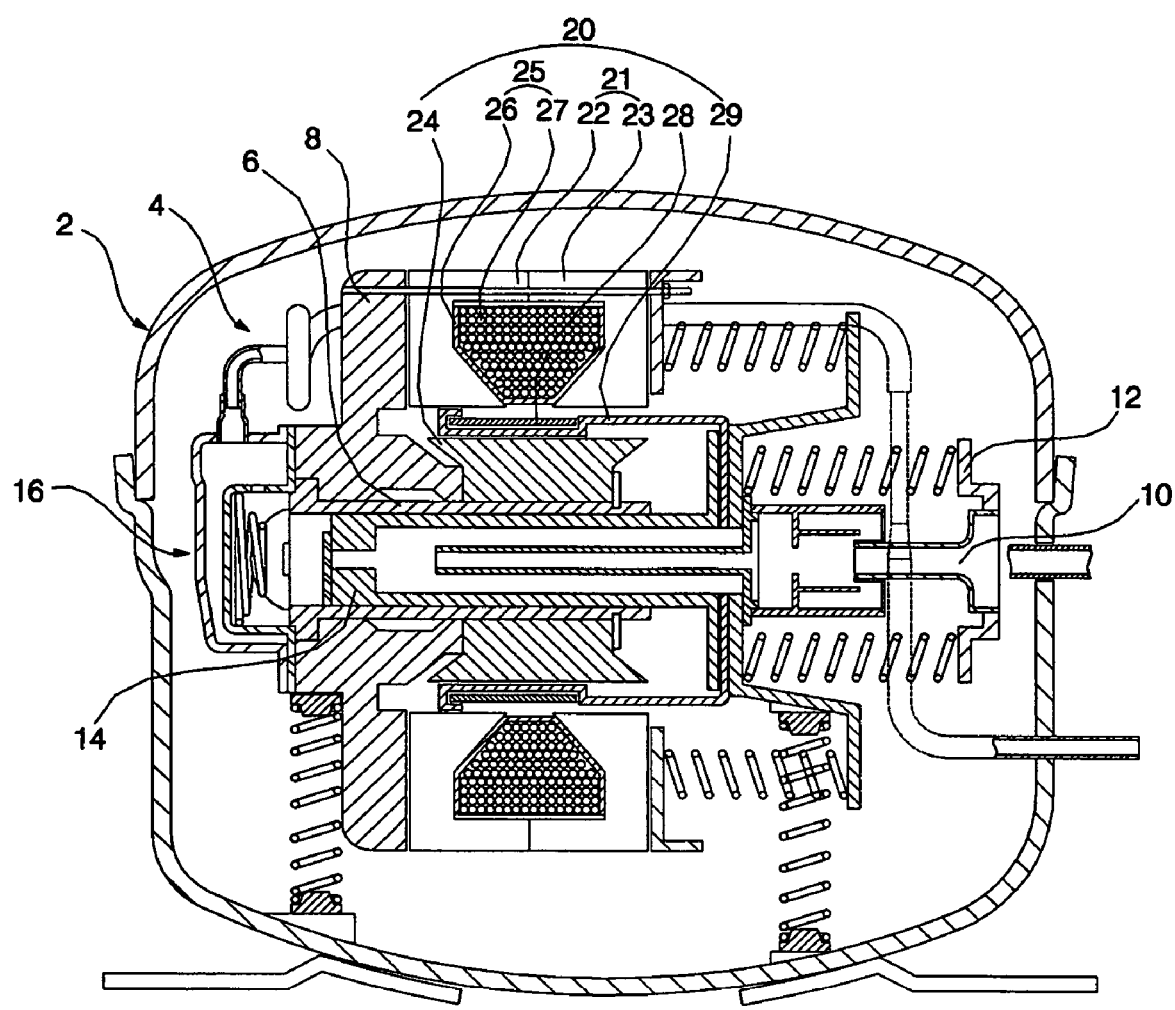
FIG. 1 is a longitudinal sectional view illustrating a linear compressor with a conventional linear motor mounted therein.
Figure 2:
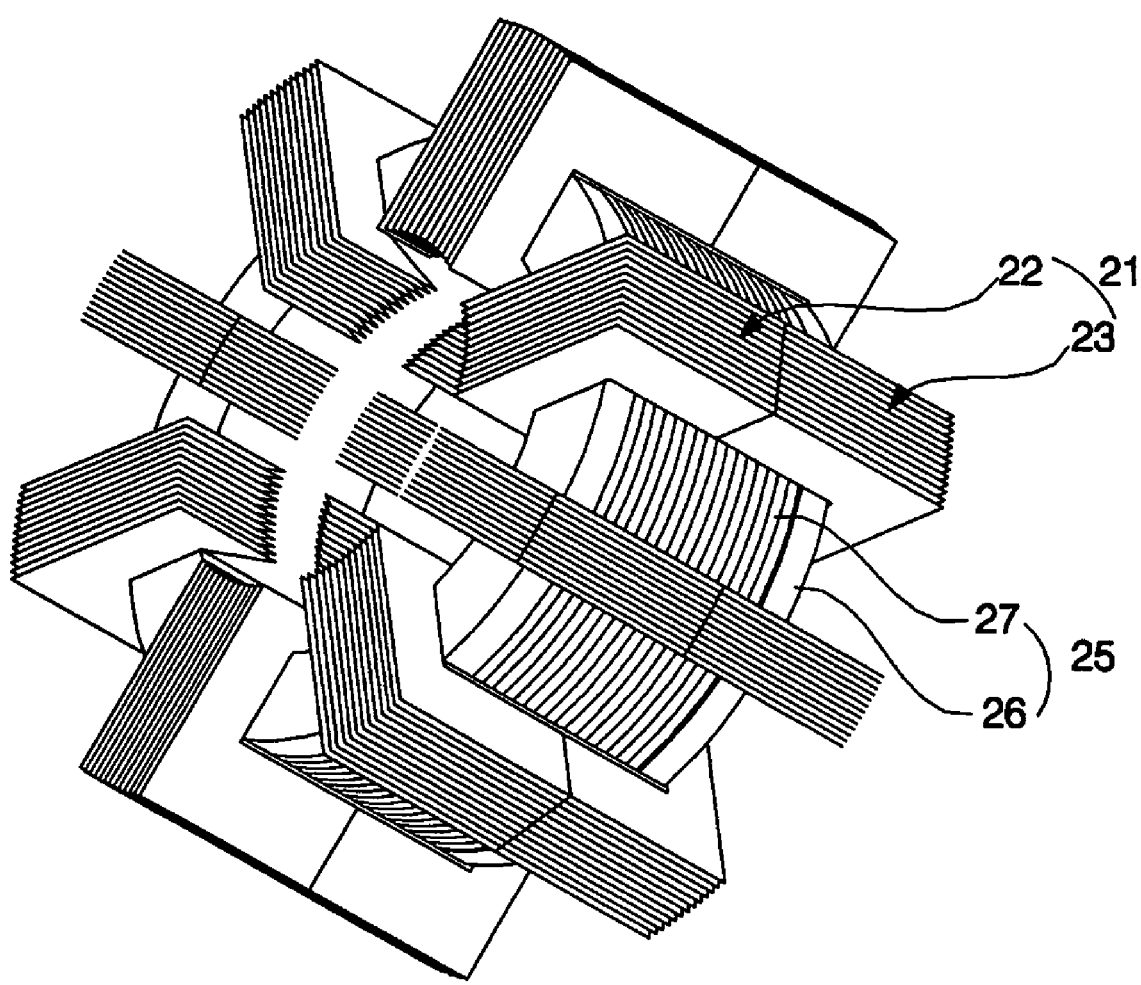
FIG. 2 is a perspective view illustrating a stator of the conventional linear motor.
Figure 3:
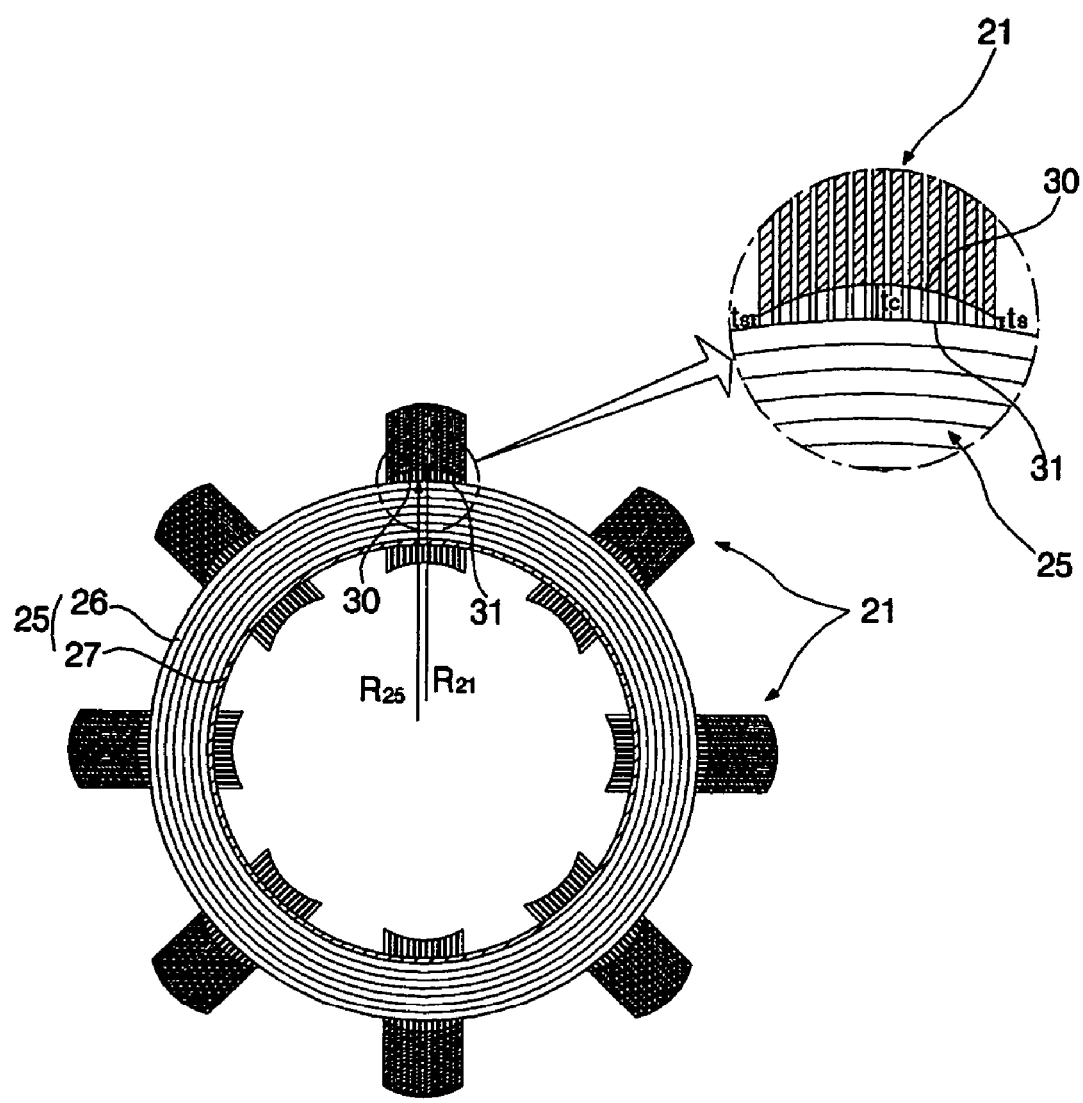
FIG. 3 is a cross-sectional view of the stator of the conventional linear motor shown in FIG. 2.
Figure 4:
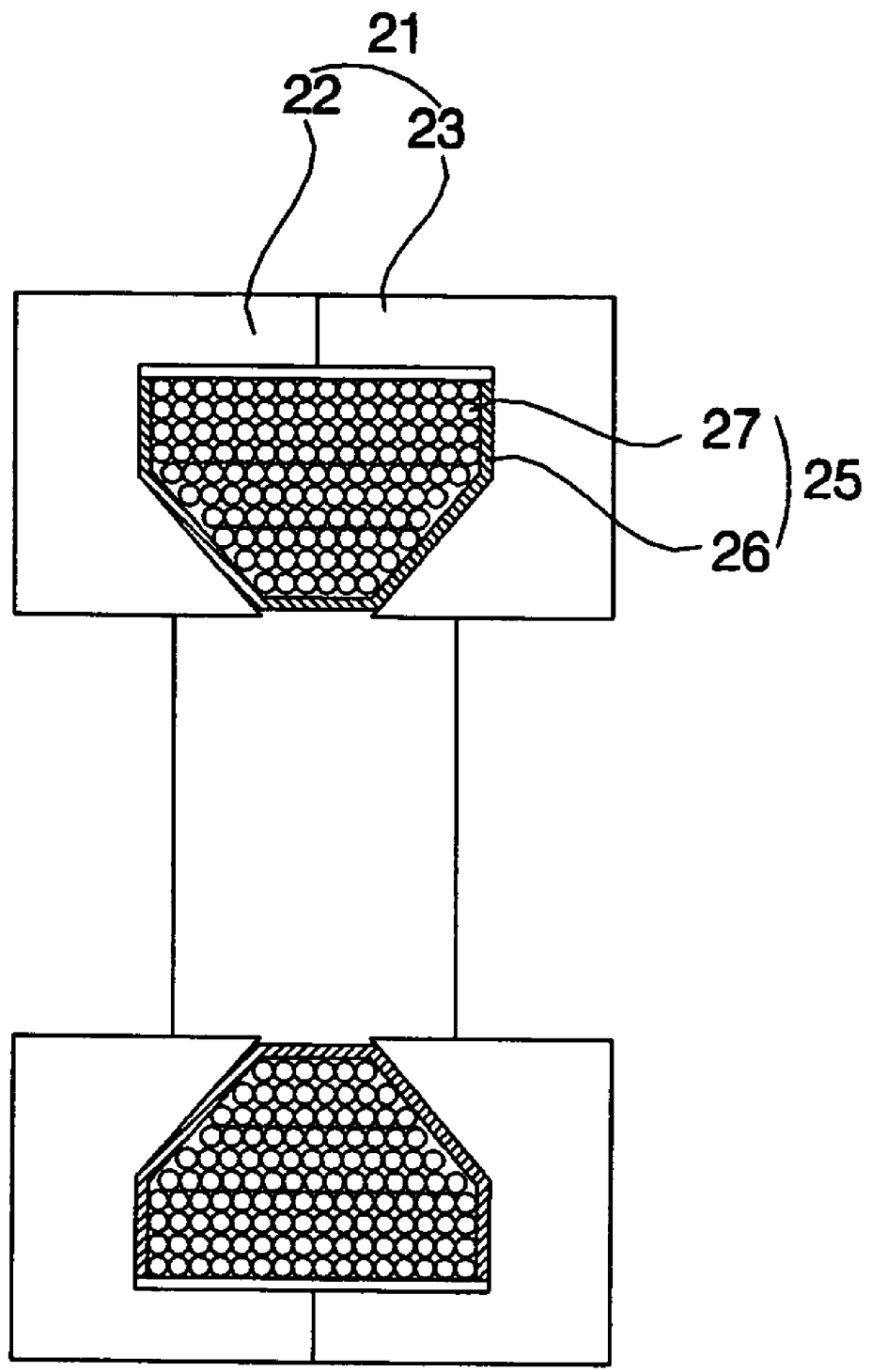
FIG. 4 is a longitudinal sectional view of the stator of the conventional linear motor shown in FIG. 2.
Figure 5:
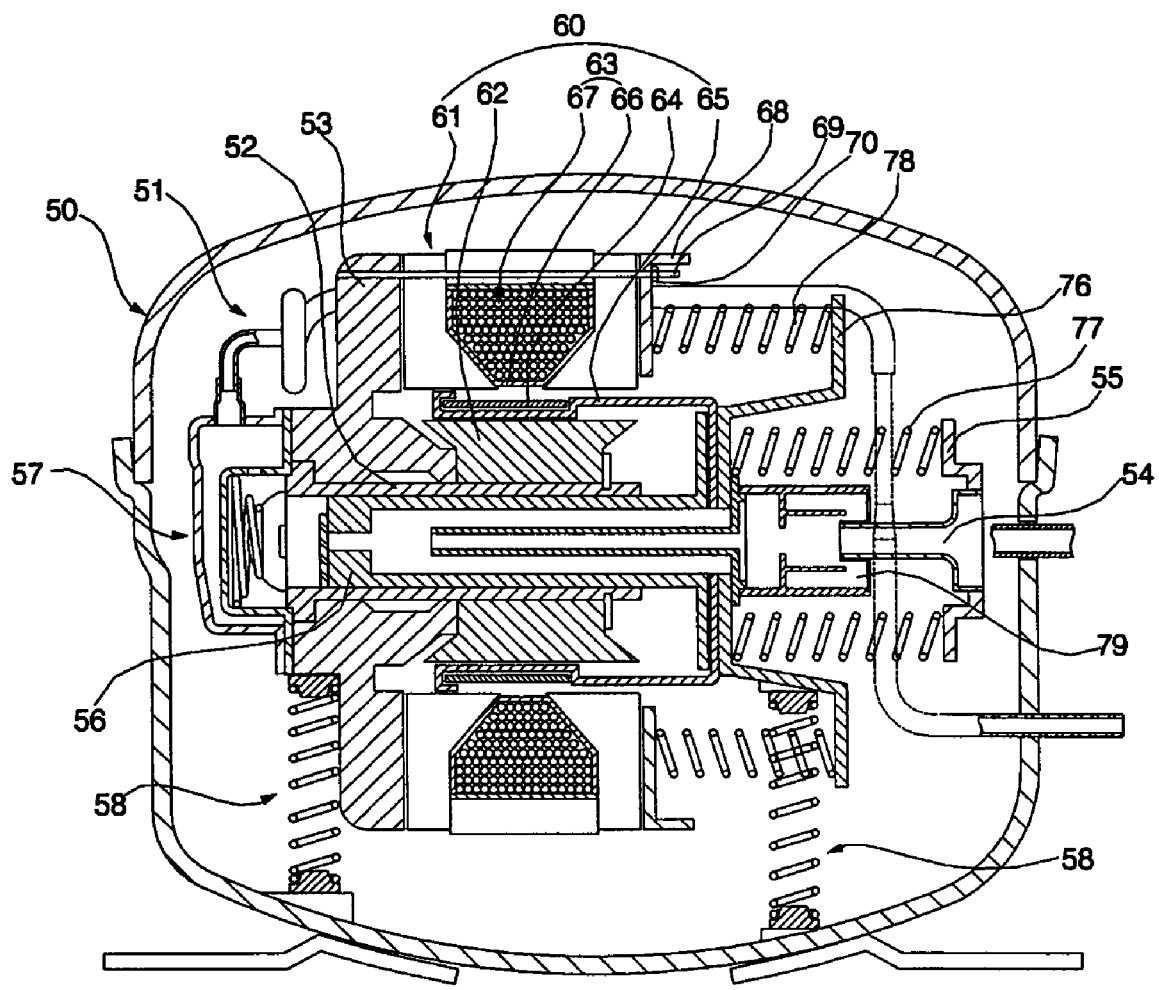
FIG. 5 is a longitudinal sectional view illustrating a linear compressor with a linear motor according to a first preferred embodiment the present invention mounted therein.
Figure 6:
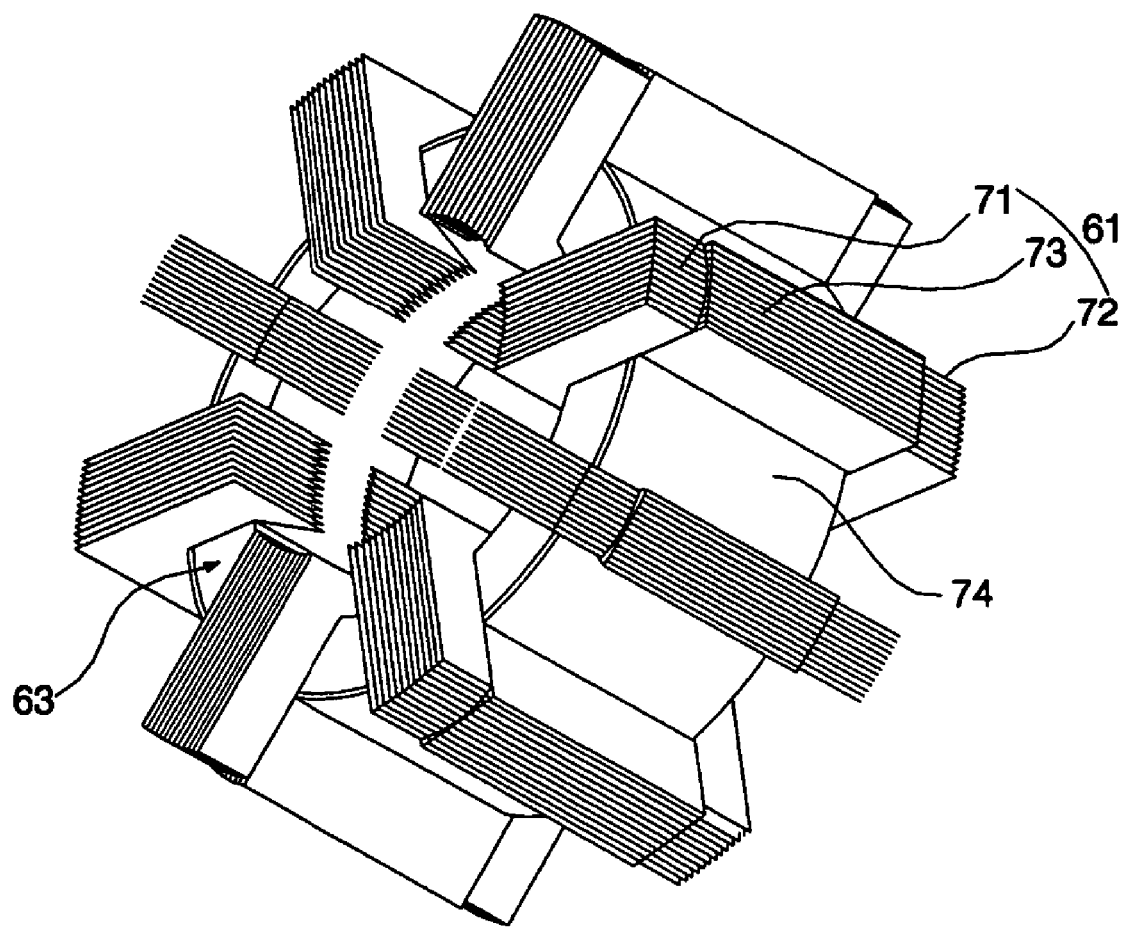
FIG. 6 is a perspective view illustrating a stator of the linear motor according to the first preferred embodiment of the present invention.
Figure 7:
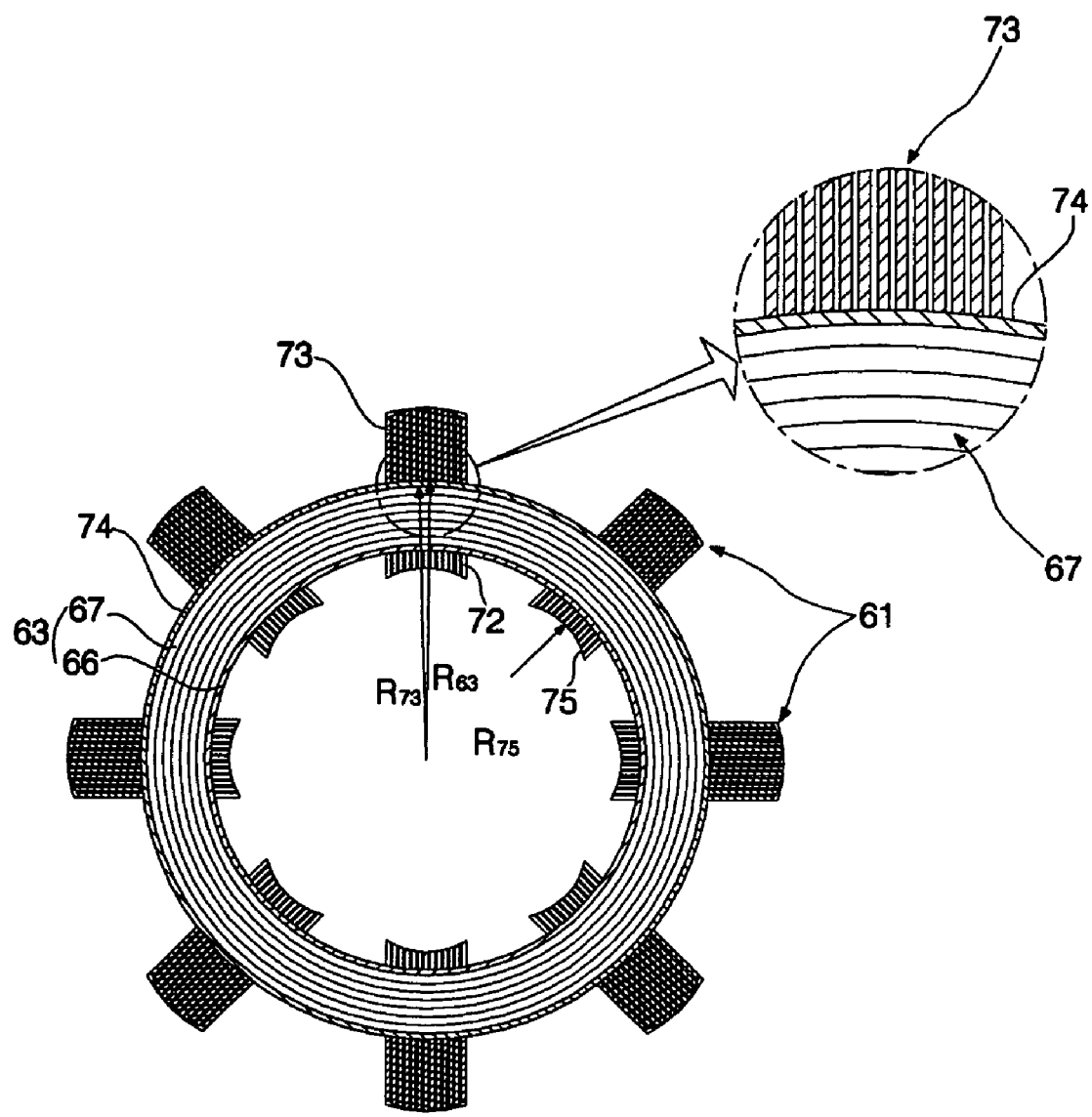
FIG. 7 is a cross-sectional view of the stator of the linear motor according to the first preferred embodiment of the present invention shown in FIG. 6.
Figure 8:
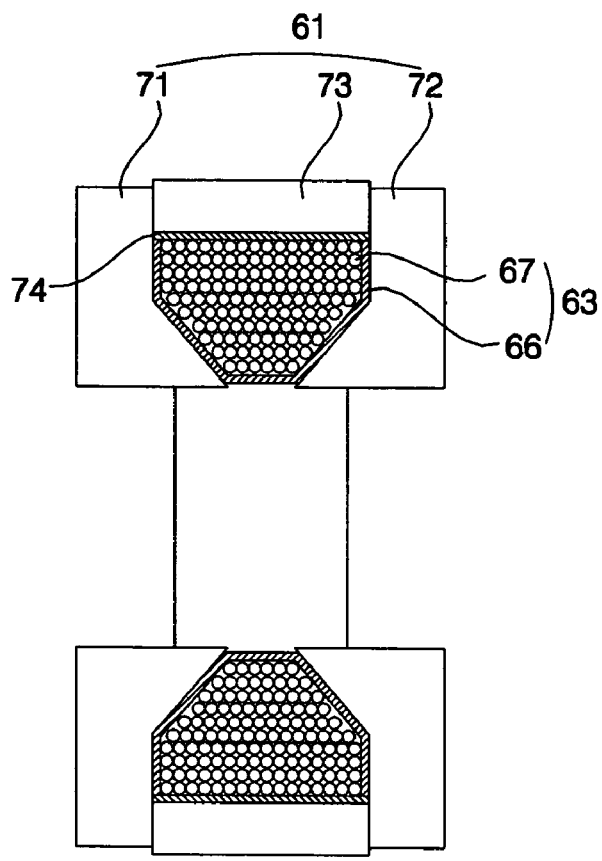
FIG. 8 is a longitudinal sectional view of the stator of the linear motor according to the first preferred embodiment of the present invention shown in FIG. 6.
Figure 9:
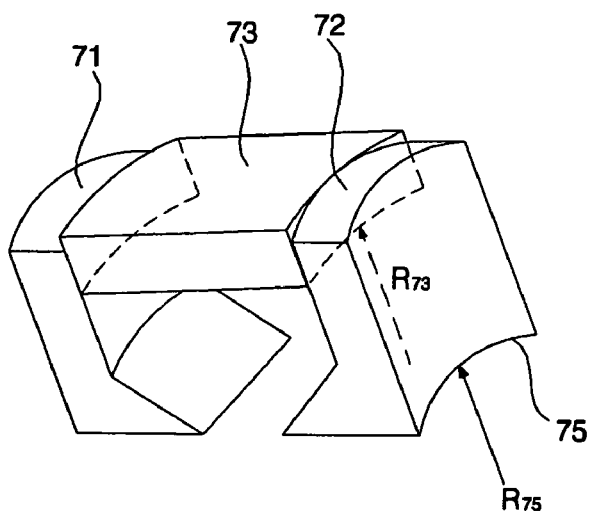
FIG. 9 is a perspective view illustrating an outer core block constituting the stator of the linear motor according to the first preferred embodiment of the present invention.

FIG. 5 is a longitudinal sectional view illustrating a linear compressor with a linear motor according to a first preferred embodiment the present invention mounted therein, FIG. 6 is a perspective view illustrating a stator of the linear motor according to the first preferred embodiment of the present invention, FIG. 7 is a cross-sectional view of the stator of the linear motor according to the first preferred embodiment of the present invention shown in FIG. 6, FIG. 8 is a longitudinal sectional view of the stator of the linear motor according to the first preferred embodiment of the present invention shown in FIG. 6, and FIG. 9 is a perspective view illustrating an outer core block constituting the stator of the linear motor according to the first preferred embodiment of the present invention.

Referring to FIG. 5, the linear compressor with the liner motor according to the present invention mounted therein comprises: a shell 50; and a linear compression unit 51 disposed in the shell 50 for compressing fluid.

The linear compression unit 51 comprises: a cylinder block 53 having a cylinder 52; a back cover 55 having a fluid inlet port 54; a piston 56 disposed such that the piston 56 performs a linear reciprocating movement in the cylinder 52; a linear motor 60 for generating a driving force necessary for the piston 56 to perform the linear reciprocating movement in the cylinder 52; an outlet valve assembly 57 disposed in the front of the cylinder 52 for discharging the fluid compressed in the cylinder 52.

The cylinder block 53 and the back cover 55 is supported by a damper 58 mounted at the inner lower part of the shell 50 in a shock-absorbing fashion.

The linear motor 60 comprises a stator and a mover.

The stator comprises: an outer core 61; an inner core 62 disposed while being spaced a predetermined gap from the outer core 61; and a coil block 63 mounted at the outer core 61. The mover comprises: a magnet 64 disposed between the outer core 61 and the inner core 62 while being spaced a predetermined gap from the outer core 61 and the inner core 62; and a magnet frame 65, to which the magnet 64 is securely fixed.

The outer core 61 comprises a plurality of outer core blocks. As shown in FIGS. 6 and 7, the outer core blocks are disposed at the outer circumferential surface of the coil block 63 at predetermined intervals in the circumferential direction.

As shown in FIG. 7, each outer core block, the inner circumferential surface of which is opposite to the outer circumferential surface of the coil block 63, has an inner diameter equal to the outer diameter of the coil block 63.

Specifically, each outer core block comprises: first and second side core blocks 71 and 72 disposed side by side while being opposite to each other; and a center core block 73 disposed between the first and second side core blocks 71 and 72.

The inner diameter $R_{73}$ of the center core block 73 is equal to the outer diameter $R_{63}$ of the coil block 63, and the inner diameter $R_{75}$ of the first and second side core blocks 71 and 72 is equal to the outer diameter of the inner core. Consequently, the inner circumferential surfaces 75 of the first and second side core blocks 71 and 72 are spaced a predetermined gap from the outer circumferential surface of the inner core 62.

Preferably, the first and second side core blocks 71 and 72 and the center core block 73 are formed of a plurality of stacked core sheets, respectively, and the first and second side core blocks 71 and 72 are securely fixed to the center core block 73 by welding.

Meanwhile, the coil block 63 comprises: a bobbin 66 mounted at the outer core 61; and a coil 67 wound on the bobbin 66 for creating a magnetic field.

The inner circumferential surface of each center core block 73 may be spaced a predetermined insulation distance from the outer circumferential surface of the coil block 63 in the radial direction, or an insulating member may be disposed between the center core blocks 73 and the coil block 63. In the following description, the insulating member is disposed between the center core blocks 73 and the coil block 63.

Preferably, the insulating member is composed of a sheet of insulating paper 74 attached on the outer circumferential surface of the coil block 63, and the insulating paper 74 entirely covers the outer circumferential surface of the coil 67.

Referring to FIG. 5, the cylinder block 53 is disposed in front of the linear motor 60, and a core cover 68 is disposed at the rear of the linear motor 60 for securely fixing the outer core 61.

The cylinder block 53 and the core cover 68 are securely connected to each other in the axial direction by means of bolts 69 and nuts 70 such that an axial compression force is applied to the outer core 61.

Also, a main spring is provided for resiliently supporting the linear reciprocating movement of the piston 56. The main spring comprises: a first main spring 77 disposed between a spring supporting member 76 fixed to the rear surface of the magnet frame 65 and the back cover 55; and a second main spring 78 disposed between the core cover 68 and the spring supporting member 76.

Between the rear end of the piston and the fluid inlet port 54 of the back cover 55 is disposed a silencer 79 for reducing noise generated when the fluid is introduced through the fluid inlet port 54.

The assembly of the stator of the linear motor with the above-stated construction according to the first preferred embodiment of the present invention will be described hereinafter in detail.

First, a plurality of core sheets are stacked, and the stacked core sheets are securely united to form the first and second side core blocks 71 and 72 and the center core block 73.

The first and second side core blocks 71 and 72 are arranged such that the first and second side core blocks 71 and 72 are opposite to each other, and the center core block 73 is disposed between the first and second side core blocks 71 and 72.

Subsequently, the first and second side core blocks 71 and 72 are securely fixed to opposite side surfaces of the center core block 73 by welding. As a result, one outer core block is obtained.

The above-mentioned process is repeated to obtain a plurality of outer core blocks. The outer core blocks are radially disposed along the outer circumferential surface of the coil block 63. In this way, the outer core is assembled.

At this time, the insulating paper 74 is attached on the outer circumferential surface of the coil block 63 such that the insulating paper 74 wholly covers the coil 67.

As a result, the inner diameter $R_{73}$ of each center core block 73 is equal to the outer diameter $R_{63}$ of the coil block 63, and the insulating paper 74 is in surface contact with the inner circumferential surface of each center core block 73. Consequently, damage to the insulating paper 74 is effectively prevented.

Electric discharge from the coil 67 to the outer core 61 is prevented by the insulating paper 74. Furthermore, heat generated from the coil 67 is easily discharged out of the outer core 61, and thus, out of the linear compressor, through the insulating paper 74.

In addition, insulation between the center core blocks 73 and the coil block 63 is accomplished by the provision of the insulating paper 74. Consequently, it is not necessary secure an additional insulation distance between each center core block 73 and the coil block 63, and therefore, the size of the linear motor 60 is reduced.

Figure 10:
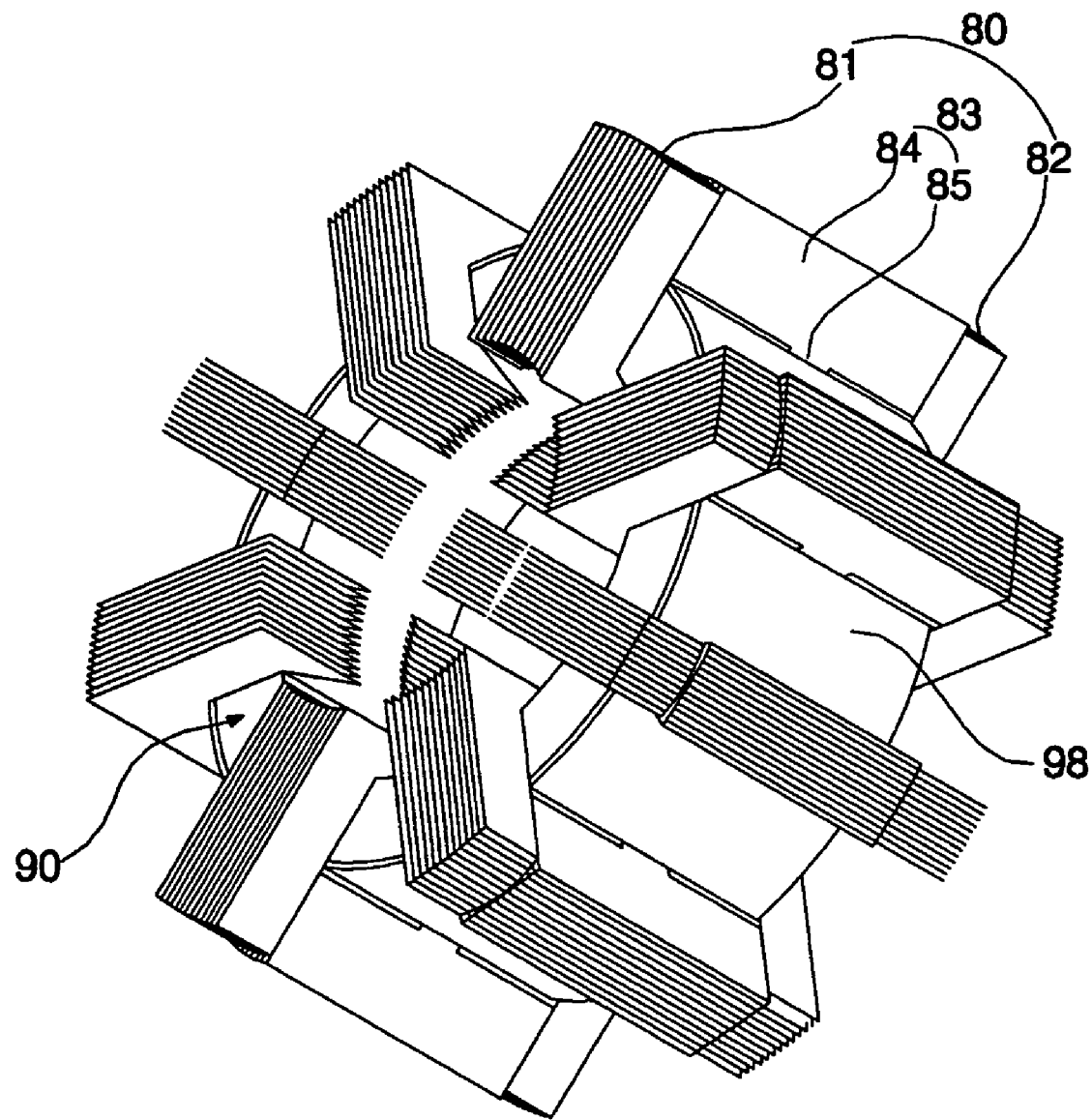
FIG. 10 is a perspective view illustrating a stator of a linear motor according to a second preferred embodiment of the present invention.
Figure 11:
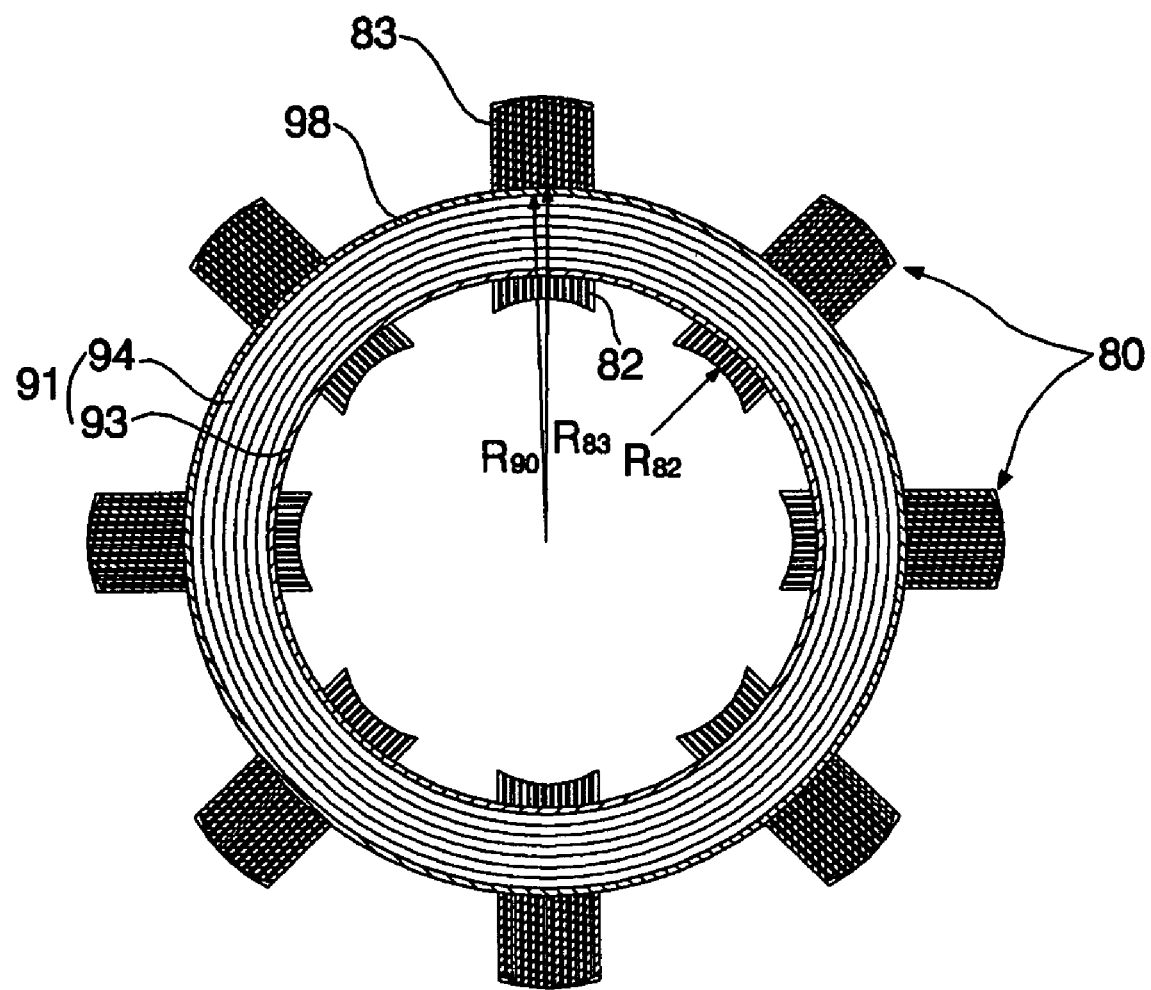
FIG. 11 is a cross-sectional view of the stator of the linear motor according to the second preferred embodiment of the present invention shown in FIG. 10.
Figure 12:
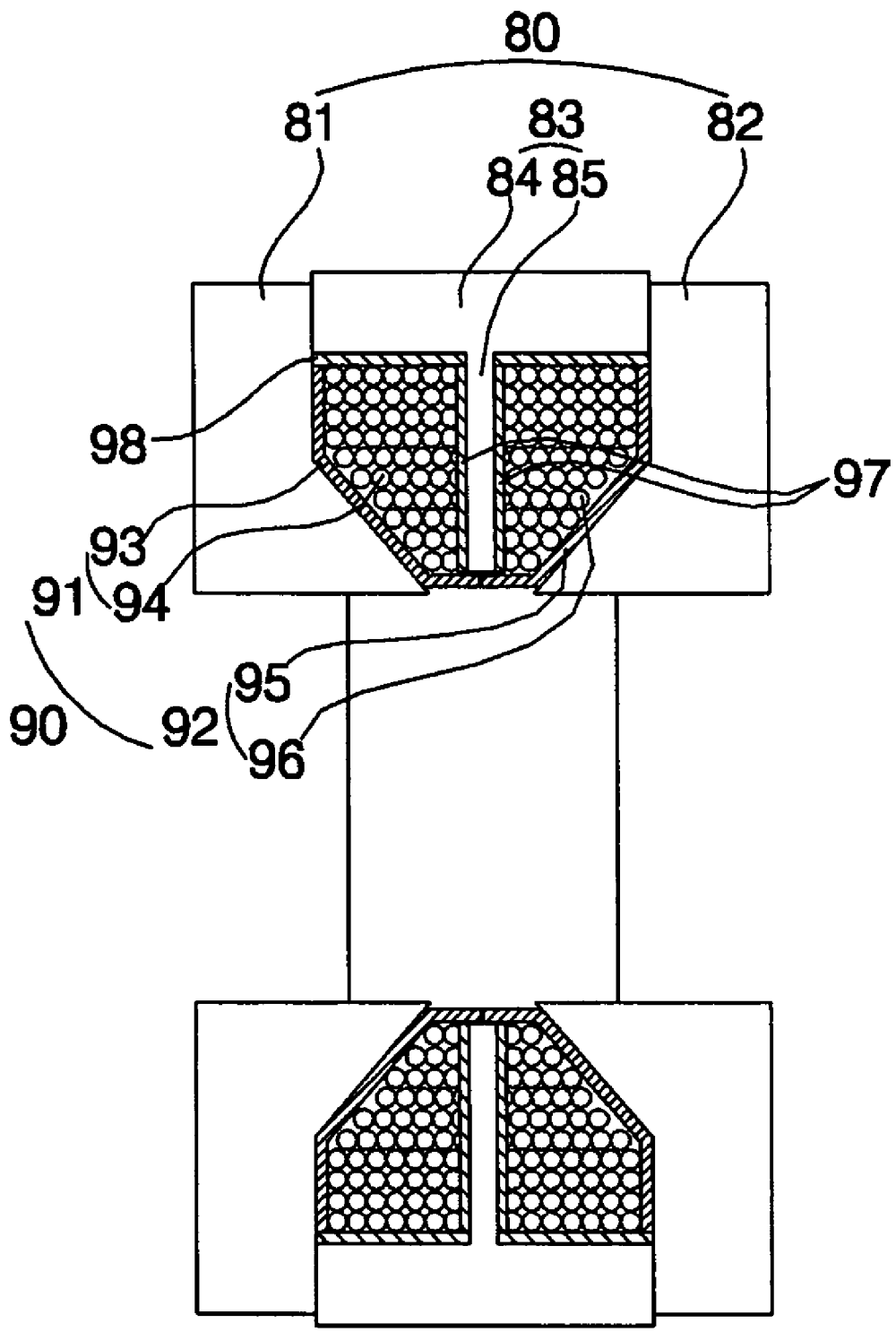
FIG. 12 is a longitudinal sectional view of the stator of the linear motor according to the second preferred embodiment of the present invention shown in FIG. 10.

FIG. 10 is a perspective view illustrating a stator of a linear motor according to a second preferred embodiment of the present invention, FIG. 11 is a cross-sectional view of the stator of the linear motor according to the second preferred embodiment of the present invention shown in FIG. 10, and FIG. 12 is a longitudinal sectional view of the stator of the linear motor according to the second preferred embodiment of the present invention shown in FIG. 10.

The linear motor according to the second preferred embodiment of the present invention comprises a stator and a mover. As shown in FIGS. 10 to 12, the stator comprises: an outer core 80; an inner core (not shown) disposed while being spaced a predetermined gap from the outer core 80; and a coil block 90 mounted at the outer core 80. The mover comprises: a magnet (not shown) disposed between the outer core 80 and the inner core; and a magnet frame (not shown), to which the magnet is securely fixed.

The outer core 80 comprises a plurality of outer core blocks. As shown in FIGS. 10 and 11, the outer core blocks are disposed at the outer circumferential surface of the coil block 90 at predetermined intervals in the circumferential direction.

As shown in FIGS. 10 and 12, each outer core block comprises: first and second side core blocks 81 and 82 disposed side by side while being opposite to each other; and a center core block 83 disposed between the first and second side core blocks 81 and 82, the center core block 83 being partially inserted in the coil block 90 to dissipate heat generated from the coil block 90.

Preferably, the first and second side core blocks 81 and 82 and the center core block 83 are formed of a plurality of stacked core sheets, respectively, and the first and second side core blocks 81 and 82 are securely fixed to the center core block 83 by welding.

The center core block 83 comprises: a core part 84, opposite side surfaces of which are attached to the first and second side core blocks 81 and 82; and a heat sink part 85 protruded from the inner circumferential surface of the core part 84 toward the coil block 90.

In the following description, the center core block 83 is formed in the shape of a "T".

The inner diameter $R_{84}$ of the core part 84 is equal to the outer diameter $R_{90}$ of the coil block 90.

The inner diameter $R_{82}$ of the first and second side core blocks 81 and 82 is equal to the outer diameter of the inner core. Consequently, the inner circumferential surfaces of the first and second side core blocks 81 and 82 are spaced a predetermined gap from the outer circumferential surface of the inner core.

Meanwhile, the coil block 90 comprises first and second coil blocks 91 and 92 disposed at opposite sides of the heat sink part 85.

The first coil block 91 comprises: a first bobbin 93 mounted at the first side core block 81; and a first coil 94 wound on the first bobbin 93. Similarly, the second coil block 92 comprises: a second bobbin 95 mounted at the second side core block 82; and a second coil 96 wound on the second bobbin 95.

In the illustrated embodiment, the first and second coils 94 and 96 are spaced a predetermined distance from each other such that the heat sink part 85 is inserted between the first and second coils 94 and 96. Alternatively, the coil block 90 may be a single body, and correspondingly, the coil may be wound such that the coil has a heat sink insertion space, into which the heat sink part 85 is inserted.

Between the heat sink part 85 and the first and second coils 94 and 96 is disposed an insulating member. Preferably, the insulating member is composed of two sheets of first insulating papers 97, which are attached to the first and second coils 94 and 96, respectively.

Meanwhile, the inner circumferential surface of the core part 84 of the center core block 83 may be spaced a predetermined insulation distance from the outer circumferential surface of the coil block 90 in the radial direction, or an insulating member may be disposed between the center core block 83 and the coil block 90. In the following description, the insulating member is disposed between the center core block 83 and the coil block 90.

Preferably, the insulating member is composed of a sheet of second insulating paper 98 attached on the outer circumferential surface of the coil block 90, and the insulating paper 98 entirely covers the outer circumferential surfaces of the first and second coils 94 and 96.

The assembly of the stator of the linear motor with the above-stated construction according to the second preferred embodiment of the present invention will be described hereinafter in detail.

First, a plurality of core sheets are stacked, and the stacked core sheets are securely united to form the first and second side core blocks 81 and 82 and the center core block 83.

The first and second side core blocks 81 and 82 are arranged such that the first and second side core blocks 81 and 82 are opposite to each other, and the center core block 83 is disposed between the first and second side core blocks 81 and 82. Subsequently, the first and second side core blocks 81 and 82 are securely fixed to opposite side surfaces of the center core block 83 by welding.

At this time, the heat sink part 85 of the center core block 83 is inserted between the first and second coils 94 and 96 of the coil block 90.

The first insulating papers 97 are disposed between the heat sink part 85 and the first coil 94 and between the heat sink part 85 and the second coil 96, respectively, and the second insulating paper 98 is disposed between the core part 84 and the outer circumferential surface of the coil block 90.

Consequently, heat generated from the coil block 90 is transmitted to the heat sink part 85, and therefore, the heat is easily dissipated out of the outer core 80.

Also, electric discharge from the coil block 90 to the heat sink part 85 is prevented by the first insulating papers 97. Furthermore, heat generated from the coil block 90 is easily transmitted to the heat sink part 85.

Also, electric discharge from the coil block 90 to the core part 84 is prevented by the second insulating paper 98. Furthermore, heat generated from the coil block 90 is easily transmitted to the core part 84 through the second insulating paper 98. Consequently, heat dissipation is promoted.

In addition, it is not necessary secure an additional insulation distance between the center core block 83 and the coil block 90, and therefore, the size of the linear motor is reduced.

As apparent from the above description, the stator of the linear motor according to the present invention has the following effects.

The stator of the linear motor according to the present invention is formed such that the each outer core block, the inner circumferential surface of which is opposite to the outer circumferential surface of the coil block, has an inner diameter equal to the outer diameter of the coil block. As a result, a minimum insulation distance is secured between each outer core block and the coil block. Consequently, the size of the linear motor is minimized, and insulation and heat transfer efficiencies are improved.

Also, each outer core block comprises first and second side core blocks and a center core block, and the inner diameter of the first and second side core blocks is different from that of the center core block. As a result, the first and second side core blocks are spaced a predetermined gap from the inner core. Consequently, efficiency of the linear motor is maintained, and the center core block is spaced a minimum insulation distance from the coil block.

Moreover, the insulating member is disposed between the outer core and the coil block. As a result, heat transfer is accomplished from the coil to the outer core through the insulating member. Consequently, heat sink efficiency is improved.

In addition, the center core block is provided with a heat sink part, which is inserted in the coil block for dissipating heat from the coil block. Consequently, heat generated from the coil block is effectively dissipated.

Furthermore, the insulating members are disposed between the heat sink part and the first coil and between the heat sink part and the second coil, respectively. Consequently, insulation efficiency is improved, and heat sink efficiency is also improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stator of a linear motor, comprising:
an outer core including a plurality of outer core blocks;
an inner core disposed while being spaced apart from the outer core by a predetermined gap;
a magnet disposed between the outer core and the inner core;
a bobbin mounted at the outer core;
a coil wound on the bobbin; and
a coil block mounted at the outer core,
wherein each of the outer core blocks comprises:
   first and second side core blocks disposed side by side while being opposite to each other; and
   a center core block disposed between the first and second side core blocks, wherein a width of the center core block is substantially equal to a width of the bobbin.

2. The stator as set forth in claim 1, wherein the first and second side core blocks are arranged such that inner circumferential surfaces of the first and second side core blocks are spaced apart from an outer circumferential surface of the inner core by the predetermined gap.

3. The stator as set forth in claim 1, wherein the first and second side core blocks are securely fixed to the center core block by welding.

4. The stator as set forth in claim 1, further comprising:
an insulating member disposed between the outer core and the coil block.

5. The stator as set forth in claim 4, wherein the insulating member is insulating paper attached on the outer circumferential surface of the coil block.

6. The stator as set forth in claim 1, wherein a radius of a curvature of an inner circumferential surface of the center core block is substantially equal to a radius of a curvature of an outer circumferential surface of the bobbin.

7. The stator as set forth in claim 1, wherein the center block is partially inserted in the coil block.

8. The stator as set forth in claim 7, wherein the center block comprises:
a core part, opposite side surfaces of which are attached to the first and second side core blocks; and
a heat sink part protruding from an inner circumferential surface of the core part toward the coil block.

* * * * *